April 18, 1939.  W. L. DE BAUFRE  2,154,668
METHOD AND APPARATUS FOR SEPARATING ETHYLENE FROM A GASEOUS
MIXTURE WITH ETHANE, METHANE, AND HYDROGEN
Filed Jan. 9, 1936

INVENTOR
W. L. de Baufre

Patented Apr. 18, 1939

2,154,668

UNITED STATES PATENT OFFICE 2,154,668

METHOD AND APPARATUS FOR SEPARATING ETHYLENE FROM A GASEOUS MIXTURE WITH ETHANE, METHANE, AND HYDROGEN

William Lane De Baufre, Lincoln, Nebr.

Application January 9, 1936, Serial No. 58,434

19 Claims. (Cl. 62—175.5)

This invention relates to the separation of gaseous mixtures by cooling and rectification, and is particularly applicable to the separation of ethylene from gaseous mixtures with ethane, methane and hydrogen.

One of the primary objects of the invention is to recover a large portion of the ethylene in a high state of purity.

A further object of the invention is to accomplish this in a simple apparatus which will be economical in operation.

Another object is to render the apparatus automatic in adjustment of refrigeration supplied to that required in maintaining operating temperatures.

Other objects are to cool the apparatus to operating temperatures and to defrost the apparatus without waste of the gaseous mixture and without contamination with atmospheric air.

These objects and such other advantages as may hereinafter appear or are incident to the invention, are realized by the method and apparatus shown in preferred form in the accompanying drawing, wherein.

Figure 1:
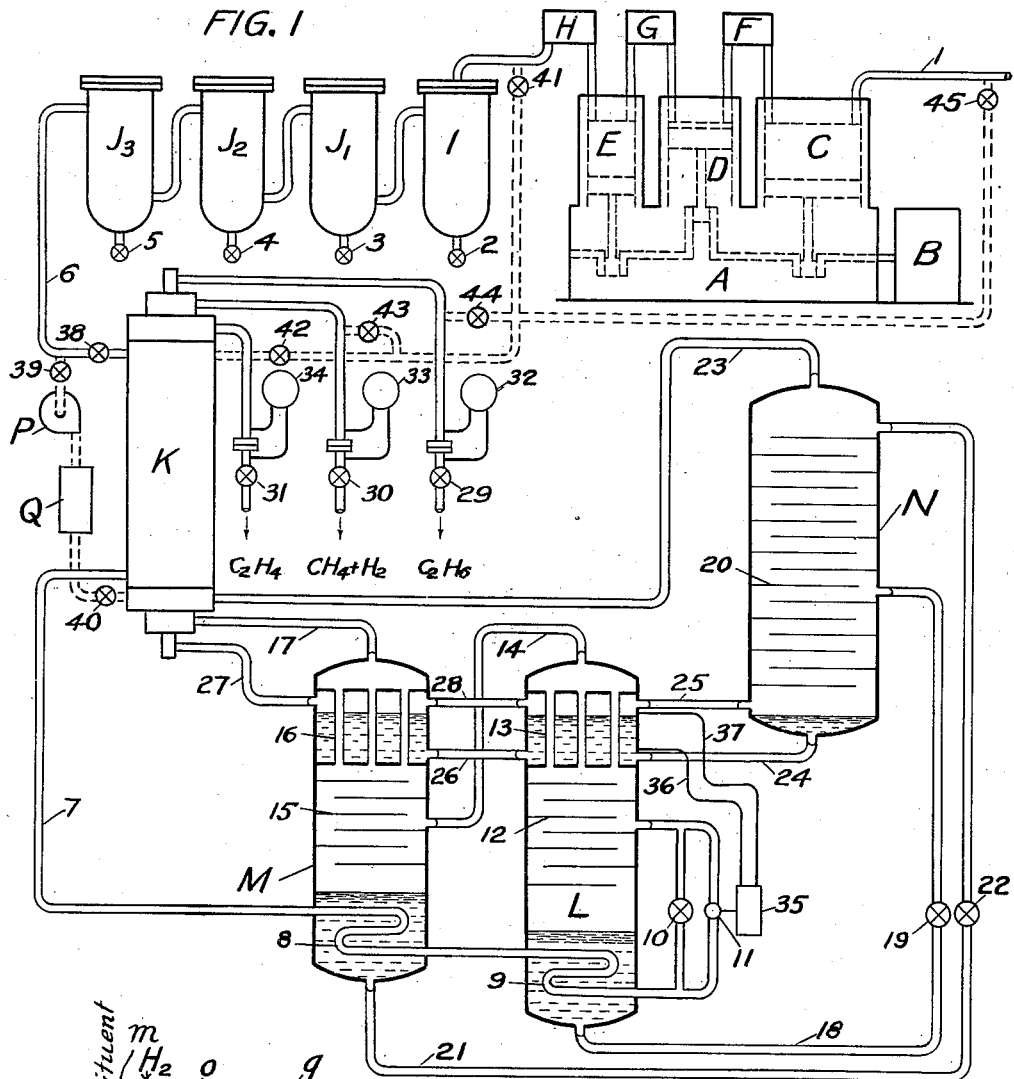
Fig. 1 is a schematic drawing, partly in section, representing the proposed method and apparatus.

Referring to Fig. 1, the apparatus includes:

Compressor A driven by motor B and having three stages C, D and E with intercoolers F and G and aftercooler H for compressing the gaseous mixture.

Separator I for removing condensed moisture from the compressed gaseous mixture.

Driers $J_1$, $J_2$ and $J_3$ for removing water vapor from the compressed gaseous mixture by means of an absorbent material therein.

Interchanger K for cooling the compressed gaseous mixture to a low temperature by heat exchange with returning separated products.

Preliminary rectifier L for separating the gaseous mixture into a liquid composed of a large part of the ethylene and most of the ethane and a vapor containing the remaining ethylene and nearly all the hydrogen and methane in the gaseous mixture.

Scrubber M for liquefying most of the remaining ethylene and scrubbing therefrom most of the hydrogen and methane in solution therein; also, for scrubbing most of the ethylene from the remaining gas composed of hydrogen and methane.

Final rectifier N for rectifying liquids from preliminary rectifier L and scrubber M.

Auxiliary blower P and heater Q for defrosting the apparatus.

Piping for defrosting and cooling but not required during normal operation is shown dotted.

Assume the original gaseous mixture to be composed of 30 per cent ethane, 40 per cent ethylene, 25 per cent methane and 5 per cent hydrogen by volume. If this gaseous mixture were cooled below atmospheric temperature, the dew point would be reached at a temperature indicated by the dotted line $ao$ in Fig. 2. Down to this temperature, the mole fractions of the several components would remain practically constant in the gaseous mixture as represented by the horizontal lines at temperatures above the dew point, to the left of line $ao$.

If this mixture were cooled below the dew point, the mole fraction of the original gaseous mixture in the liquid phase would increase as represented by the distance of the curve $ae$ above the base line $ab$. The mole fraction of the original gaseous mixture remaining in the gaseous, or vapor, phase would decrease as represented by the distance of the curve $ae$ below the line $mn$. The variations of the mole fractions of the several constituents in the liquid and vapor phases would be as represented by the distances between the different curves.

Thus, at the temperature below the dew point represented by the line $pq$, most of the ethane ($C_2H_6$) is liquefied as shown by the distance between the curves $ac$ and $ab$ compared with the distance between the curves $fg$ and $ae$. A large portion of the ethylene ($C_2H_4$) is in the liquid phase as indicated by the distance between the curves $ad$ and $ac$ compared with the distance between the curves $hi$ and $fg$. But little methane ($CH_4$) is in the liquid phase as shown by the small distance between curves $ae$ and $ad$. Most of the methane ($CH_4$) remains in the vapor phase as shown by the distance between curves $kl$ and $hi$. The hydrogen ($H_2$) all remains in the vapor phase as shown by the distance between curves $mn$ and $kl$, except for a small amount in solution in the other liquefied gases.

By further cooling to a lower temperature, the proportions of the several constituents in the liquid and vapor phases change as shown by the vertical distances between the different curves to the right of the line $pq$. Thus, liquefaction of the ethane becomes more nearly complete, a greater portion of the ethylene is liquefied, more methane is liquefied, but practically none of the hydrogen is liquefied within the temperature range shown. By cooling to any designated temperature such as represented by the line *pq* and then withdrawing the vapor phase from the liquid phase, a more or less complete separation can be effected of the hydrogen and methane from the ethylene and ethane. Then, by rectification, the ethylene can be separated from the ethane.

Figure 2:
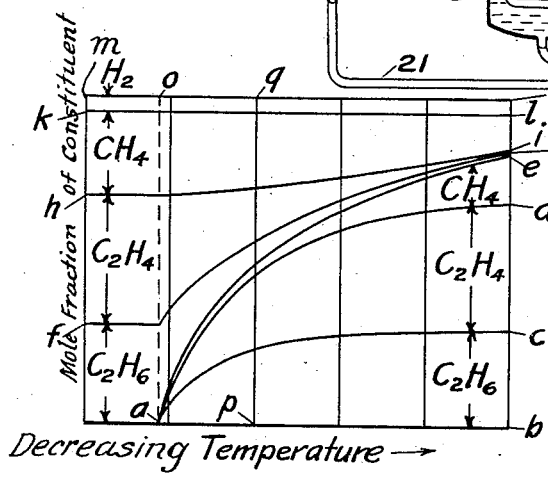
Fig. 2 is a set of curves showing how the compositions of the liquid and vapor phases change when a mixture of hydrogen, methane, ethylene and ethane are cooled below the dew point temperature.

The recovery of ethylene and its purity will depend upon the temperature to which the mixture is cooled before the vapor phase is withdrawn. It will also depend upon the pressure because the curves in Fig. 2 are displaced on the temperature scale and somewhat changed in shape with change in pressure.

The apparatus in Fig. 1 is arranged to cool the gaseous mixture until the liquefied portion comprises most of the ethane and a large portion of the ethylene originally in the gaseous mixture, to withdraw the remaining vapor containing most of the methane and hydrogen, and then to rectify the liquefied ethane and ethylene. The recovery and the purity of the ethylene are increased by scrubbing the vapor withdrawn in order to recover ethylene therefrom, and by scrubbing the liquefied gases to remove methane and hydrogen dissolved therein. This scrubbing is facilitated by a preliminary rectification which is also employed in order to effect a more nearly complete separation in the final rectification of the ethane and ethylene.

The Joule-Thompson effect, in accordance with which a compressed gas is cooled upon expansion below its inversion temperature, is utilized in combination with the regenerative cooling of William Siemens to cool the apparatus to operating temperatures and to balance heat leak and other thermodynamic losses during normal operation. A special feature of the method and apparatus is the automatic arrangement for balancing the refrigeration supplied in this way against the refrigeration requirements of the apparatus.

The gaseous mixture to be separated is supplied to three-stage compressor A through pipe 1. This gaseous mixture is successively compressed in cylinder C, cooled in intercooler F, further compressed in cylinder D, cooled in intercooler G, further compressed in cylinder E and finally cooled in aftercooler H. The compressed gaseous mixture then flows through separator I where moisture is mechanically separated from the compressed gaseous mixture and drained away through valve 2. In order to remove water vapor, the compressed gaseous mixture is then passed through driers $J_1$, $J_2$ and $J_3$, which contain solid caustic potash or other material for removing water vapor from the gas flowing therethrough by absorption or adsorption. Sludge is drained away from these driers through valves 3, 4 and 5.

The dry compressed gaseous mixture then flows through pipe 6 and valve 38 to interchanger K where it is cooled by heat exchange with returning cold products separated from the gaseous mixture as hereinafter described. The drawing represents a tubular type of regenerator in which the several products flow through tubes between multicompartment heads while the compressed gaseous mixture flows around and across these tubes. Recuperators could be used, however, in which heat absorbent material is alternately cooled by the returning products and warmed by the downflowing gaseous mixture. In this case, it might be unnecessary to dry the gaseous mixture before cooling.

The cooled compressed gaseous mixture flows through pipe 7 to coiled tubes 8 and 9 within scrubber M and preliminary rectifier L where the gaseous mixture is further cooled while under the compression pressure by boiling the liquids therein. The more or less liquefied gaseous mixture is throttled through manually controlled valve 10 or automatically controlled valve 11 or both valves, and enters preliminary rectifier L at an intermediate tray 12. The liquid phase is here separated from the vapor phase, the compositions being as shown by the curves in Fig. 2 for the existing pressure and temperature.

The liquid phase flows down from tray to tray while subjected to the scrubbing action of vapor reflux produced by boiling liquid which reaches the bottom of preliminary rectifier L. This scrubbing action removes nearly all the hydrogen and methane in solution therein and increases the proportion of ethane in the liquid phase. The vapor phase rises through the trays above the inlet where it is subjected to the scrubbing action of liquid reflux produced by condensing some of the rising vapor within tubes 13 at the top of preliminary rectifier L. This scrubbing action removes most of the ethane from the rising vapor and adds ethylene, methane and hydrogen thereto. As a result, the vapor which finally leaves through pipe 14 contains nearly all the methane and hydrogen in the original gaseous mixture along with a portion of the ethylene therein, but very little ethane. And, the liquid which accumulates around coiled tubes 9 consists of most of the ethane in the original gaseous mixture commingled with a large portion of the ethylene therein, but practically no methane or hydrogen.

The vapor flowing through pipe 14 is discharged into scrubber M at an intermediate tray 15. Rising through the trays above the inlet, this vapor is subjected to the scrubbing action of a liquid reflux produced by condensing a portion of the vapor within tubes 16. This liquid reflux flows down from tray to tray where it is subjected below the inlet to the scrubbing action of rising vapor produced by boiling the liquid which finally reaches the bottom of the scrubber. As a consequence of these scrubbing actions, most of the methane and hydrogen are scrubbed out of the liquid which accumulates around coiled tubes 8 and most of the ethylene is scrubbed out of the vapor or gas which leaves through pipe 17.

The liquid ethane and ethylene which accumulates around coiled tubes 9 in preliminary rectifier L, flows through pipe 18 and is throttled through valve 19 into final rectifier N at an intermediate tray 20. The nearly pure liquid ethylene which accumulates around coiled tube 8 in scrubber M, flows through pipe 21 and is throttled through valve 22 onto the topmost tray in final rectifier N. In flowing down from tray to tray, these liquids are subjected to rising vapor produced by boiling the liquid which finally reaches the bottom of final rectifier N. As a result of this rectifying action with a nearly pure ethylene liquid discharged into the top of the final rectifier, nearly pure ethylene vapor leaves the top through pipe 23 and nearly pure ethane liquid leaves the bottom through pipe 24.

Part of the nearly pure ethane liquid is vaporized by heat transfer through tubes 13 from the vapor condensing therein. The resulting vapor returns through pipe 25 to the bottom of final rectifier N to form the vapor reflux therein. The remaining nearly pure ethane liquid flows through pipe 26 and is vaporized by heat transfer through tubes 16 from the vapor condensing within these tubes. This vaporized ethane leaves through pipe 27. Pipe 28 is provided for flow of ethane vapor in either direction as may be required.

The nearly pure ethane flowing through pipe 27, the mixture of methane and hydrogen flowing through pipe 17 and the nearly pure ethylene flowing through pipe 23, all return to the several compartments at the lower end of interchanger K. Flowing up through the tubes therein to the corresponding compartments at the top of interchanger K, these gases, warmed about to room temperature, leave through valves 29, 30 and 31 as indicated. These valves are operated to maintain the flows necessary to obtain the desired purities of products, the respective flows being shown on flow meters 32, 33 and 34.

During normal operation of the apparatus shown in Fig. 1, the three-stage compressor A is driven at substantially constant speed by motor B. Due to the positive displacement of the piston within cylinder C, there is a constant rate of mass flow of the gaseous mixture from pipe 1 and through the whole system. Levels of the liquids surrounding coiled tubes 8 and 9 are maintained constant by manual operation of throttle valves 19 and 22. These valves could be automatically controlled to maintain the liquid levels constant. Valves 29, 30 and 31 are manually operated to maintain constant the flows of the products therethrough, as indicated on flow gages 32, 33 and 34.

Then, any inequality in the refrigeration supplied relative to the refrigeration required to maintain the apparatus at operating temperatures, will result in a change in level of the liquid surrounding tubes 13 and 16 and in the bottom of final rectifier N. This liquid level may therefore be employed as a guide in maintaining equality of refrigeration supplied and required.

The refrigeration required is largely out of control of the operator, being determined by the surrounding room temperature, effectiveness of the insulating material surrounding the plant, and efficiency of the apparatus. The refrigeration supplied, however, is under control of the operator by varying the compression pressure of the gaseous mixture. The higher the compression pressure, the greater the amount of refrigeration supplied, and vice versa.

The compression pressure is varied by opening or closing valves 10 and 11. The wider these valves are open, the lower will be the compression pressure necessary to force the partly liquefied mixture through them at a constant rate of mass flow. Hence, valve 10 may be manually operated to maintain a constant level of liquid surrounding tubes 13 and 16; being closed somewhat when the liquid level falls and being opened somewhat when the liquid level rises.

Automatic means for maintaining this liquid level is shown at 35, operating valve 11 in accordance with the differential pressure between two points—one above and the other below the desired liquid level—connected by tubes 36 and 37 to device 35. This automatic means of operating valve 11 must be damped so that the response to variations in liquid level occurs very slowly or at intervals only or the range of valve positions must correspond with a wide variation in liquid level. Otherwise, valve movements will be so erratic that satisfactory control will not be obtained.

After a period of normal operation, it will be necessary to shut down in order to defrost the plant of ice and snow accumulated therein. The equipment and piping shown dotted may be employed for defrosting in the following manner, some of the gaseous mixture being circulated and redried to avoid introducing air into the apparatus which has been filled with a combustible hydrocarbon gas. Valve 38 is closed and valves 39, 40, 41 and 42 are opened. Steam or other heat is applied to heater Q and auxiliary blower P is started to recycle gas through heater Q, valve 40, pipe 23, final rectifier N, etc. The flow from final rectifier N is obviously determined by which of valves 19, 22, 10, 43 and 44 are open. In any case, the gas returns through driers $J_1$, $J_2$ and $J_3$ and valve 39 to blower P.

After all parts of the apparatus have been defrosted, which will be shown by becoming warm, the apparatus is ready to be recooled to operating temperatures. While recooling from room to operating temperatures, it is also desirable to recycle the gaseous mixture until the desired purities of products are attained. Valves 39, 40, 41, 42 and 44 are closed and valves 38, 43 and 45 are opened. Compressor A is then started and valve 10 adjusted to maintain the highest permissible compression pressure. The expanded gas will return through valves 43 and 45 to the suction of compressor A. Preliminary rectifier L, scrubber M and interchanger K will be rapidly cooled to operating temperatures. Then, liquid will collect around coiled tube 9, and this liquid may be throttled into final rectifier N. When the latter cools down, liquid will flow into the spaces surrounding tubes 13 and 16. Liquid will soon thereafter collect around coiled tube 8. As soon as the desired liquid levels are reached, products of desired purities may be withdrawn through valves 29, 30 and 31, valves 43 and 45 being closed.

The purities of the products are determined by the proportions of the apparatus in relation to the composition of the original gaseous mixture and are not entirely under control of the operator by varying the flows through valves 29, 30 and 31. Also, it may be desired to produce products of lowered purities because impure products are satisfactory for certain purposes. For these reasons, the terms ethylene, ethane, etc., when used for the several products, are to be taken as representing more or less pure gases, depending upon the controllable or uncontrollable conditions of operation.

I claim:

1. Apparatus for separating ethylene from a compressed gaseous mixture with ethane, methane and hydrogen, including means for cooling the compressed gaseous mixture by heat exchange with cold products of separation, a preliminary rectifier for separating the gaseous mixture into a liquid consisting of most of the ethane and a large portion of the ethylene and a vapor containing most of the methane and hydrogen and the remaining ethylene in the said gaseous mixture, a scrubber for liquefying the remaining ethylene and separating therefrom most of the methane and hydrogen, a final rectifier for separating the liquid mixture of ethane and ethylene from said preliminary rectifier into nearly pure ethane liquid and nearly pure ethylene vapor by utilizing the nearly pure ethylene liquid from said scrubber as a liquid reflux, means for vaporizing liquid ethane from said final rectifier and condensing vapor from said preliminary rectifier whereby vapor reflux is produced in said final rectifier and liquid reflux is produced in said preliminary rectifier, means for completing the vaporization of the liquid ethane in liquefying the remaining ethylene in said scrubber, and means for returning ethylene vapor from said final rectifier, ethane vapor from said scrubber and the gaseous mixture of methane and hydrogen from said scrubber in heat exchange with the compressed gaseous mixture being cooled.

2. Apparatus for separating ethylene from a compressed gaseous mixture with ethane, methane and hydrogen as in claim 1, including means for further cooling the compressed gaseous mixture in vaporizing the liquid mixture of ethane and ethylene in said preliminary rectifier to produce vapor reflux therein.

3. Apparatus for separating ethylene from a compressed gaseous mixture with ethane, methane and hydrogen as in claim 1, including means for further cooling the compressed gaseous mixture in vaporizing the liquid ethylene in said scrubber to produce vapor reflux therein.

4. Apparatus for separating ethylene from a compressed gaseous mixture with ethane, methane and hydrogen as in claim 1, including a throttle valve for throttling the compressed gaseous mixture into said preliminary rectifier, and automatic means for operating said throttle valve in accordance with the liquid level of the liquid ethane from said final rectifier whereby the refrigeration supplied by throttling the compressed gaseous mixture is brought into balance with the refrigeration required to keep the apparatus at normal operating temperatures.

5. Apparatus for separating ethylene from a compressed gaseous mixture with ethane, methane and hydrogen as in claim 1, including means for recycling the gaseous mixture through the apparatus, means for recompressing the gaseous mixture and means for recooling the gaseous mixture after recompression until operating temperatures have been reached in said preliminary rectifier, said scrubber and said final rectifier.

6. Apparatus for separating ethylene from a compressed gaseous mixture with ethane, methane and hydrogen as in claim 1, including an auxiliary blower for circulating the gaseous mixture through the apparatus to defrost the same, means for warming the gaseous mixture before circulating it, and means for drying the gaseous mixture before recirculating it.

7. Apparatus for separating a compressed gaseous mixture, including a preliminary rectifier, a final rectifier, a vaporizer for vaporizing liquid from said final rectifier and condensing vapor from said preliminary rectifier, a throttle valve for throttling the compressed gaseous mixture into said preliminary rectifier, and automatic means for operating said throttle valve in accordance with the liquid level in said vaporizer whereby the refrigeration supplied by throttling the compressed gaseous mixture is brought into balance with the refrigeration required to keep the apparatus at normal operating temperatures.

8. Apparatus for separating a compressed gaseous mixture, including a throttle valve for reducing the pressure of the gaseous mixture, a vessel wherein the level of liquefied gas varies when the refrigeration supplied by throttling the compressed gaseous mixture is not in balance with the refrigeration requirements of said apparatus, and automatic means for operating said throttle valve in accordance with the liquid level in said vessel whereby the refrigeration supplied is brought into balance with the refrigeration required.

9. Apparatus for separating a gaseous mixture by rectification below atmospheric temperature, including an interchanger for cooling the gaseous mixture by heat exchange with returning separated products, a rectifier for separating the cooled gaseous mixture into products, an auxiliary blower for blowing the gaseous mixture through said interchanger and rectifier, means for returning the gaseous mixture from said interchanger and rectifier to said auxiliary blower and means for drying the gaseous mixture before recycling the same, whereby said interchanger and rectifier are defrosted.

10. Apparatus for separating the gaseous mixture by rectification below atmospheric temperature as in claim 9, including means for warming the gaseous mixture before recycling the same.

11. Apparatus for separating a gaseous mixture by rectification below atmospheric temperature, including driers for removing water vapor from the gaseous mixture by means of absorbent material therein, an interchanger for cooling the dried gaseous mixture by heat exchange with returning separated products, a rectifier for separating the cooled gaseous mixture into products, an auxiliary blower for blowing dried gaseous mixture from said driers through said rectifier and interchanger, and a by-pass from said rectifier and interchanger to said driers, whereby said rectifier and interchanger are defrosted by blowing through them gaseous mixture which has been dried before recycling the same.

12. Method of separating ethylene from a gaseous mixture containing ethane, methane and hydrogen, which includes subjecting the gaseous mixture to a preliminary rectification whereby a liquid component is obtained containing most of the ethane and a gaseous component is obtained containing most of the methane and hydrogen, cooling said gaseous component to obtain a liquid of nearly pure ethylene, withdrawing the remaining gaseous component containing most of the methane and hydrogen, and subjecting the liquid component containing most of the ethane to a final rectification with the nearly pure ethylene liquid as a liquid reflux, whereby nearly pure ethylene is obtained as a gaseous product and most of the ethane remains in the liquid product of the final rectification.

13. Method of separating ethylene from a gaseous mixture containing ethane, methane and hydrogen as in claim 12, wherein liquid reflux for the preliminary rectification and vapor reflux for the final rectification are obtained by heat exchange between vapor from the preliminary rectification and liquid from the final rectification.

14. Method of separating ethylene from a gaseous mixture containing ethane, methane and hydrogen as in claim 12, wherein the ethane remaining in the liquid product of the final rectification is vaporized in cooling the gaseous component of the preliminary rectification to obtain a liquid of nearly pure ethylene.

15. Method of separating ethylene from a gaseous mixture containing ethane, methane and hydrogen as in claim 12, wherein the liquid of nearly pure ethylene is utilized for scrubbing the gaseous component of the preliminary rectification to recover ethylene therefrom.

16. Method of separating ethylene from a compressed gaseous mixture containing ethane, methane and hydrogen, which includes cooling the compressed gaseous mixture, throttling the cooled compressed gaseous mixture to a lower pressure, further cooling the gaseous mixture at said lower pressure until the ethane and ethylene are mostly liquefied in two portions, one of ethane and ethylene and the other of nearly pure ethylene, heating both liquefied portions in cooling the compressed gaseous mixture in order to drive from the liquefied ethane and ethylene the hydrogen and methane in solution therein, withdrawing and subsequently rectifying the liquefied ethane and ethylene, utilizing the nearly pure ethylene liquid as a liquid reflux in rectifying the liquid mixture of ethane and ethylene.

17. Method of separating ethylene from a gaseous mixture containing ethane, methane and hydrogen, which includes cooling the gaseous mixture until the ethane and ethylene are mostly liquefied in two portions, one of ethane and ethylene and the other of nearly pure ethylene, withdrawing and subsequently rectifying the liquefied ethane and ethylene, utilizing the nearly pure ethylene liquid as a liquid reflux in rectifying the liquid mixture of ethane and ethylene.

18. Method of separating a gaseous mixture containing relatively highly volatile constituents, which includes cooling the gaseous mixture until a portion is liquefied, further cooling the unliquefied gaseous mixture until a second portion is liquefied, heating the second liquefied portion to drive therefrom said highly volatile constituents in solution therein, withdrawing the remaining gaseous portion containing said highly volatile constituents, and subsequently rectifying both liquefied portions.

19. Method of separating a compressed gaseous mixture containing relatively highly volatile constituents, which includes cooling and throttling the compressed gaseous mixture to a lower pressure whereby a portion is liquefied, further cooling the unliquefied gaseous mixture until a second portion is liquefied, heating the second liquefied portion by heat exchange with the compressed gaseous mixture before throttling whereby highly volatile constituents in solution in the second liquefied portion are driven therefrom, withdrawing the remaining gaseous portion containing said highly volatile constituents, and subsequently rectifying both liquefied portions.

WILLIAM LANE DE BAUFRE.